United States Patent
Zhang

(10) Patent No.: US 10,814,884 B2
(45) Date of Patent: Oct. 27, 2020

(54) AUTONOMOUS VEHICLE SITE TEST METHOD AND APPARATUS, DEVICE AND READABLE MEDIUM

(71) Applicant: BAIDU ONLINE NETWORK TECHNOLOGY (BEIJING) CO., LTD., Haidian District Beijing (CN)

(72) Inventor: Song Zhang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 239 days.

(21) Appl. No.: 16/022,002

(22) Filed: Jun. 28, 2018

(65) Prior Publication Data

US 2019/0009789 A1    Jan. 10, 2019

(30) Foreign Application Priority Data

Jul. 5, 2017    (CN) .......................... 2017 1 05429708

(51) Int. Cl.
*B60W 50/04*    (2006.01)
*G01M 17/007*    (2006.01)
(Continued)

(52) U.S. Cl.
CPC ........ *B60W 50/045* (2013.01); *G01M 17/007* (2013.01); *G05D 1/0088* (2013.01);
(Continued)

(58) Field of Classification Search
CPC ....... B60W 2554/00; B60W 2050/046; B60W 50/045; G07C 5/008; G05D 1/0088; G05D 2201/0213; G06K 9/00798; G01M 17/007
(Continued)

(56) References Cited

U.S. PATENT DOCUMENTS

2016/0171893 A1*  6/2016  Chen ..................... G01S 15/931
                                                701/300
2016/0257216 A1*  9/2016  Al-Awami ............ B60L 53/665
(Continued)

FOREIGN PATENT DOCUMENTS

CN    103852265 A    6/2014
CN    106291736 A    1/2017
(Continued)

OTHER PUBLICATIONS

1st Chinese Office Action corresponding to Chinese Application No. 201710542970.8 dated Nov. 21, 2019.
(Continued)

*Primary Examiner* — Behrang Badii
*Assistant Examiner* — Hossam M Abd El Latif
(74) *Attorney, Agent, or Firm* — Lando & Anastasi, LLP

(57) ABSTRACT

The present disclosure provides an autonomous vehicle site test method and apparatus, a device and a readable medium. The method comprises: in a site test, collecting state information of the autonomous vehicle in real time; according to the state information of the autonomous vehicle and a pre-obtained test demand, obtaining deployment information of a simulated obstacle needed in the test, wherein the deployment information of the simulated obstacle includes a simulated obstacle class, a deployment location of the simulated obstacle and a predetermined action of the simulated obstacle; according to the deployment information of the simulated obstacle, controlling the simulated obstacle corresponding to the simulated obstacle class to perform a predetermined action at the deployment location, to test the autonomous vehicle's response performance to the deployed simulated obstacle.

18 Claims, 3 Drawing Sheets

(51) Int. Cl.
  *G05D 1/00* (2006.01)
  *G06K 9/00* (2006.01)
  *G07C 5/00* (2006.01)

(52) U.S. Cl.
  CPC ......... *G06K 9/00798* (2013.01); *G07C 5/008* (2013.01); *B60W 2050/046* (2013.01); *B60W 2554/00* (2020.02); *G05D 2201/0213* (2013.01)

(58) Field of Classification Search
  USPC .......................................................... 701/32
  See application file for complete search history.

(56) References Cited

U.S. PATENT DOCUMENTS

| | | | |
|---|---|---|---|
| 2017/0132117 A1* | 5/2017 | Stefan ................. | G06F 11/3604 |
| 2019/0137287 A1* | 5/2019 | Pazhayampallil ...... | H04W 4/40 |
| 2020/0065443 A1* | 2/2020 | Liu ......................... | H04W 4/44 |

FOREIGN PATENT DOCUMENTS

| | | |
|---|---|---|
| CN | 106525454 A | 3/2017 |
| CN | 106706341 A | 5/2017 |
| CN | 106769085 A | 5/2017 |

OTHER PUBLICATIONS

Chinese Search Report from corresponding Chinese Application No. 2017105429708 dated Nov. 11, 2019.

* cited by examiner

AUTONOMOUS VEHICLE SITE TEST METHOD AND APPARATUS, DEVICE AND READABLE MEDIUM

The present application claims the priority of Chinese Patent Application No. 2017105429708, filed on Jul. 5, 2017, with the title of "Autonomous vehicle site test method and apparatus, device and readable medium". The disclosure of the above applications is incorporated herein by reference in its entirety.

FIELD OF THE DISCLOSURE

The present disclosure relates to the technical field of computer application, and particularly to an autonomous vehicle site test method and apparatus, a device and a readable medium.

BACKGROUND OF THE DISCLOSURE

An autonomous vehicle is a smart vehicle, also called a wheeled movable robot, and it achieves driverless driving mainly relying on an in-vehicle smart driving instrument with a computer system as a core. Integrating many technologies such as automatic control, system structure, artificial intelligence and visual computing, the autonomous vehicle is a product of advanced development of computer sciences, model recognition and intelligent control technology, is an important sign of a country's scientific research strength and industry level, and has a broad application prospect in fields such as national defense and national economy.

Currently, the autonomous vehicle is still in a constant research and development and testing phase. To improve the test accuracy, it is usual in the prior art to allow the autonomous vehicle to run on a real road, and test the autonomous vehicle according to real road conditions of the real road.

However, in the real road, many real road conditions are very complicated and dangerous, and even cause traffic accidents and damages to people and vehicles. Therefore, the test safety of the current autonomous vehicle is very poor.

SUMMARY OF THE DISCLOSURE

The present disclosure provides an autonomous vehicle site test method and apparatus, a device and a readable medium, to improve safety of the test of the autonomous vehicle.

The present disclosure provides an autonomous vehicle site test method, the method comprising:

in a site test, collecting state information of the autonomous vehicle in real time;

according to the state information of the autonomous vehicle and a pre-obtained test demand, obtaining deployment information of a simulated obstacle needed in the test, wherein the deployment information of the simulated obstacle includes a simulated obstacle class, a deployment location of the simulated obstacle and a predetermined action of the simulated obstacle;

according to the deployment information of the simulated obstacle, controlling the simulated obstacle corresponding to the simulated obstacle class to perform a predetermined action at the deployment location, to test the autonomous vehicle's response performance to the deployed simulated obstacle.

Further optionally, in the above method, the obtaining deployment information of a simulated obstacle needed in the test, according to the state information of the autonomous vehicle and a pre-obtained test demand specifically comprises:

judging whether the state information of the autonomous vehicle reaches predetermined state information of the autonomous vehicle set in the test demand;

if yes, obtaining, from the test demand, deployment information of the simulated obstacle needed in the test.

Further optionally, in the method, the collecting state information of the autonomous vehicle in real time specifically comprises:

receiving in real time at least one of the autonomous vehicle's location, travel speed, travel direction and acceleration reported by the autonomous vehicle in real time.

Further optionally, in the method, the collecting state information of the autonomous vehicle in real time further comprises:

receiving, in real time, a total number of lanes of the road where the autonomous vehicle travels, transmitted by an information collecting system arranged in the test site, and an identifier of the lane where the autonomous vehicle is located.

Further optionally, in the method, before obtaining deployment information of a simulated obstacle needed in the test, according to the state information of the autonomous vehicle and a pre-obtained test demand, the method further comprises:

receiving the test demand input by a tester through a human-machine interface module;

furthermore, the simulated obstacle class includes people, vehicles or traffic lights.

Further optionally, in the method, the step of, according to the deployment information of the simulated obstacle, controlling the simulated obstacle corresponding to the simulated obstacle class to perform a predetermined action at the deployment location, specifically comprises:

according to the deployment information of the simulated obstacle, controlling, in a wireless communication manner, the simulated obstacle corresponding to the simulated obstacle class to perform the predetermined action at the deployment location.

The present disclosure provides an autonomous vehicle site test control apparatus, comprising:

a collecting module configured to, in a site test, collect state information of the autonomous vehicle in real time;

an obtaining module configured to, according to the state information of the autonomous vehicle and a pre-obtained test demand, obtain deployment information of a simulated obstacle needed in the test, wherein the deployment information of the simulated obstacle includes a simulated obstacle class, a deployment location of the simulated obstacle and a predetermined action of the simulated obstacle;

a control module configured to, according to the deployment information of the simulated obstacle, control the simulated obstacle corresponding to the simulated obstacle class to perform a predetermined action at the deployment location, to test the autonomous vehicle's response performance to the deployed simulated obstacle.

Further optionally, in the above apparatus, the obtaining module is specifically configured to:

judge whether the state information of the autonomous vehicle reaches predetermined state information of the autonomous vehicle set in the test demand;

if yes, obtain, from the test demand, deployment information of the simulated obstacle needed in the test.

Further optionally, in the apparatus, the collecting module is specifically configured to receive in real time at least one of the autonomous vehicle's location, travel speed, travel direction and acceleration reported by the autonomous vehicle in real time.

Further optionally, in the apparatus, the collecting module is specifically configured to receive, in real time, a total number of lanes of the road, transmitted by an information collecting system arranged in the test site, and an identifier of the lane where the autonomous vehicle is located.

Further optionally, the autonomous vehicle site test control apparatus further comprises:

a receiving module configured to receive the test demand input by a tester through a human-machine interface module;

furthermore, the simulated obstacle class includes people, vehicles or traffic lights.

Further optionally, in the apparatus, the control module is specifically configured to, according to the deployment information of the simulated obstacle, control, in a wireless communication manner, the simulated obstacle corresponding to the simulated obstacle class to perform a predetermined action at the deployment location.

The present disclosure further provides a computer device, comprising:

one or more processors, a storage for storing one or more programs, the one or more programs, when executed by said one or more processors, enable said one or more processors to implement the above-mentioned autonomous vehicle site test method.

The present disclosure further provides a computer readable medium on which a computer program is stored, the program, when executed by a processor, implementing the above-mentioned autonomous vehicle site test method.

According to the autonomous vehicle site test method and apparatus, the device and the readable medium of the present disclosure, it is feasible to, in the site test, collect state information of the autonomous vehicle in real time; according to the state information of the autonomous vehicle and a pre-obtained test demand, obtain deployment information of a simulated obstacle needed in the test, wherein the deployment information of the simulated obstacle includes a simulated obstacle class, a deployment location of the simulated obstacle and a predetermined action of the simulated obstacle; according to the deployment information of the simulated obstacle, controlling the simulated obstacle corresponding to the simulated obstacle class to perform a predetermined action at the deployment location, to test the autonomous vehicle's response performance to the deployed simulated obstacle. As compared with testing the autonomous vehicle in the real road in the prior art, the autonomous vehicle test scheme of the present embodiment may avoid people's injury and death and damages to vehicles in the real road, and therefore can effectively improve the test safety of the autonomous vehicle.

DETAILED DESCRIPTION OF PREFERRED EMBODIMENTS

The present disclosure will be described in detail with reference to figures and specific embodiments to make objectives, technical solutions and advantages of the present disclosure more apparent.

Figure 1:
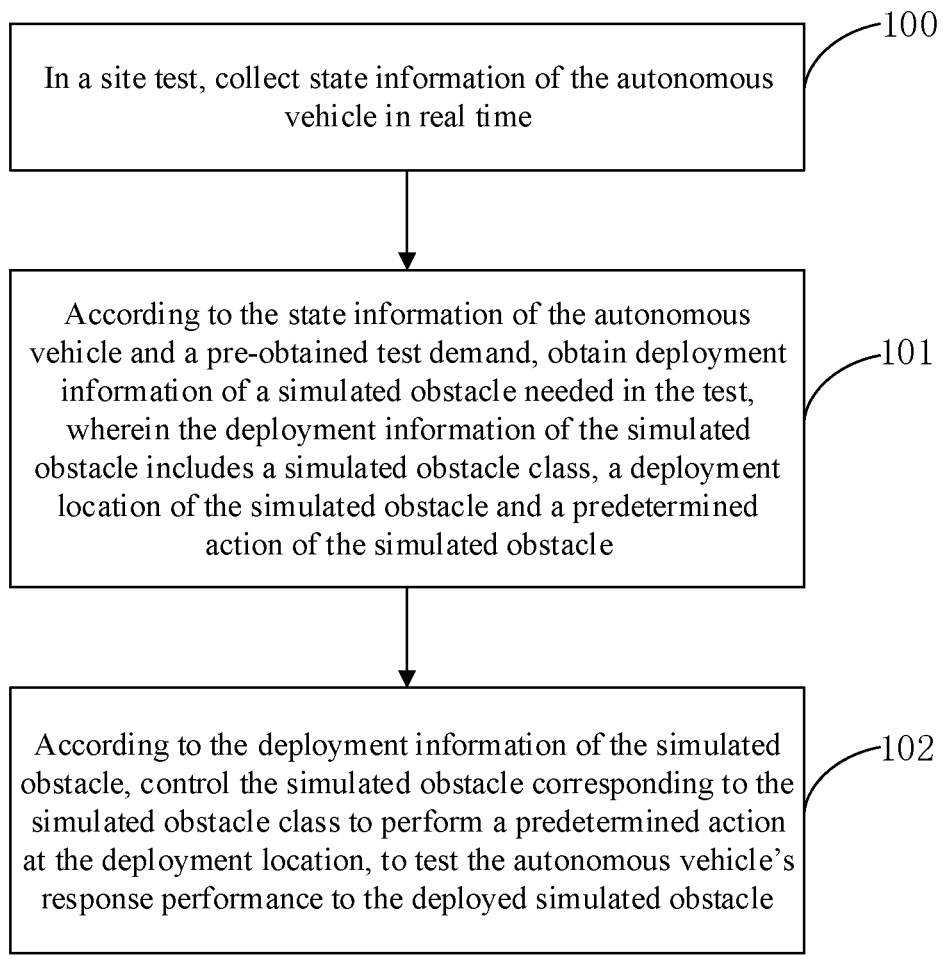
FIG. 1 is a flow chart of an embodiment of an autonomous vehicle site test method according to the present disclosure.

FIG. 1 is a flow chart of an embodiment of an autonomous vehicle site test method according to the present disclosure. As shown in FIG. 1, the autonomous vehicle site test method according to the present embodiment may specifically include the following steps:

100: in a site test, collecting state information of the autonomous vehicle in real time;

Different from the test on real roads in the prior art, the autonomous vehicle site test method according to the present embodiment is perform road condition test in a test site. To increase testing safety and avoid occurrence of traffic accidents, the test site of the present embodiment may be a closed test site built according to a topologic structure of many real roads. Hence, there are external normal pedestrians and vehicles in the test site, so it possible to avoid occurrence of traffic accidents and improve testing safety of autonomous vehicles when autonomous vehicles are tested. In the site test of the present embodiment, it is possible to control the autonomous vehicle via a control center for example a site test control apparatus of the autonomous vehicle, and implement the site test of the autonomous vehicle. Upon site test, the site test control apparatus of the autonomous vehicle may collect the state information of the autonomous vehicle in real time. For example, the state information of the autonomous vehicle may include information such as vehicle location, travel speed, travel direction, acceleration, a total number of lanes of the road where the autonomous vehicle is located, and an identifier of the lane where the autonomous vehicle is located.

101: according to the state information of the autonomous vehicle and a pre-obtained test demand, obtaining deployment information of a simulated obstacle needed in the test, wherein the deployment information of the simulated obstacle includes a simulated obstacle class, a deployment location of the simulated obstacle and a predetermined action of the simulated obstacle;

The test demand of the present embodiment is preset or pre-obtained from the external and stored in the site test control apparatus of the autonomous vehicle. The test demand may include multiple pieces of test information for testing the autonomous vehicle, to test a response performance of the autonomous vehicle when the autonomous vehicle reaches a certain preset state information and an obstacle appears in the test. The preset state information reached by the autonomous vehicle may be reaching a certain speed or a certain location. Therefore, each test information may include predetermined state information of the autonomous vehicle and information related to the simulated obstacle. Information of the number of steps of the obstacle may be determined according to the information related to the obstacle.

Hence, optionally, step 101 of the present embodiment may specifically include the following steps:

(a1) judging whether the state information of the autonomous vehicle reaches predetermined state information of the autonomous vehicle set in the pre-obtained test demand; if yes, performing step (a2);

(a2) obtaining, from the test demand, deployment information of the simulated obstacle needed in the test.

For example, the test information of the present embodiment may include testing pedestrians at one meter outside the lane when the speed of the autonomous vehicle reaches 60 km/h, and testing the response performance of the autonomous vehicle when the autonomous vehicle is 5 meters away from the pedestrian and the pedestrian moves towards inward the lane at a uniform speed of 1 m/second. Alternatively, the test information may further include testing the response performance of the autonomous vehicle if the traffic light at 10 meters ahead of the autonomous vehicle when the speed of the autonomous vehicle reaches 40 km/h. Alternatively, the test information may further include testing the response performance of the autonomous vehicle when a vehicle at 10 meters ahead of the autonomous vehicle is running at a speed of 40 km/h and when the autonomous vehicle prepares to overtake. The above test information is only partial test information in the test demand. The test demand may further include testing the response performance of the autonomous vehicle when obstacles corresponding to other obstacle classes such as bicycles, electrical bicycles and motorcycles are under other traffic scenarios. Examples are no longer listed one by one here. It needs to be appreciated that the test information in the test demand may be constructed according to scenarios in which traffic accidents are likely to happen in the road in the prior art, so that authenticity of the test information may be ensured and thereby testing efficiency of the autonomous vehicles may be improved; then, it is possible to, after the test, adjust improper control parameters of the autonomous vehicle, and effectively improve the safety of the autonomous vehicle.

The test demand of the present embodiment may be set by a tester in the site test control apparatus of the autonomous vehicle. The site test control apparatus of the autonomous vehicle receives the test demand input by the tester through a human-machine interface module. The human-machine interface module of the present embodiment may include a mouse and/or keyboard. Alternatively, the human-machine interface module may further be a touch screen of the site test control apparatus of the autonomous vehicle. The tester may implement input of the test demand through the touch screen. Alternatively, the test demand may further be preset by the tester and stored in other devices similar to computers, whereupon the site test control apparatus of the autonomous vehicle may obtain the test demand preset by the tester from external devices similar to computers.

In the present embodiment, when the test demand only includes one piece of test information, it is feasible to obtain, from the test information of the test demand, deployment information of the simulated obstacle needed in the test, according to the state information of the autonomous vehicle and the test information in the pre-obtained test demand. Or, when the test demand includes multiple pieces of test information, not each piece of test information is adapted for the current autonomous vehicle. For example, if the travel speed of the current autonomous vehicle already reaches 60 km/h, this is certainly inapplicable for the test information that a preset state of the autonomous vehicle is that the travel speed of the autonomous vehicle is 40 km/h. Therefore, it is feasible to, according to the state information of the autonomous vehicle and each piece of test information in the test demand, obtain, from multiple pieces of test information, a certain piece of test information suitable for the current autonomous vehicle, and then obtain, from the test information of the test demand, deployment information of the simulated obstacle needed in the test. The deployment information of the simulated obstacle may include a class of the simulated obstacle, a deployment location of the simulated obstacle and a predetermined action of the simulated obstacle. For example, the simulated obstacle class may include people, vehicles or traffic lights. Or, the class of the simulated obstacle may further include obstacles appearing in real roads such as bicycles, electrical bicycles and motorcycles. The deployment location of the simulated obstacle may be an initial location of the simulated obstacle. The preset action of the simulated obstacle may be an action change of the simulated obstacle at the initial location, for example a color change of traffic lights. Or, the preset action of the simulated obstacle may further be the simulated obstacle's travel direction and trajectory starting from the initial position, for example, may be that a pedestrian walks from the initial position towards inward the road at a speed of 1 m/s; or may be that a tricycle runs from the initial location towards inside the road at a speed of 3 m/s, and so on.

Optionally, the preset state information in the test information in the test demand in the present embodiment may comprise at least one of the autonomous vehicle's location, travel speed, travel direction and acceleration. At this time, the step 100 "collecting state information of the autonomous vehicle in real time" may specifically comprise: receiving in real time at least one of the autonomous vehicle's location, travel speed, travel direction and acceleration reported by the autonomous vehicle in real time.

Or further optionally, the preset state information in the test information in the test demand in the present embodiment may further comprise an identifier of a lane where the autonomous vehicle is located. At this time, the step 100 "collecting state information of the autonomous vehicle in real time" may specifically comprise: receiving, in real time, a total number of lanes of the road where the autonomous vehicle travels, transmitted by an information collecting system arranged in the test site, and an identifier of the lane where the autonomous vehicle is located, for example, the autonomous vehicle is currently in the second lane or the first lane. At this time, an information collecting system may be arranged in the test site of the present embodiment. The information collecting system may collect some information in the test site, for example, the total number of lanes of the road where the autonomous vehicle is currently located in the test site, and the identifier of the lane where the autonomous vehicle is currently located. At this time, it is feasible to test some test information about the autonomous vehicle's lane change. For example, when the autonomous vehicle is traveling in the second lane, and when the autonomous vehicle detects that there is an immobile obstacle at five meters ahead, test is carried out as to whether the autonomous vehicle can change lanes in time. For example, it is possible to test whether the autonomous vehicle can correctly perform overtake in the current lane.

102: according to the deployment information of the simulated obstacle, controlling the simulated obstacle corresponding to a simulated obstacle class to perform a predetermined action at the deployment location, to test the autonomous vehicle's response performance to the deployed simulated obstacle.

The travel of the simulated obstacle in the test site of the present embodiment is controlled by the site test control apparatus of the autonomous vehicle. For example, the simulated obstacle in the test site is provided with a receiving module configured to receive a control instruction sent from the site test control apparatus of the autonomous vehicle, to control the simulated obstacle to perform a predetermined action at the deployment location. Furthermore, in the simulated obstacle is further provided a slideable wheel and a controller for executing the control instruction. The controller may, according to the control instruction received by the receiving module, control the simulated obstacle to slide to the deployment location via the wheel, and execute the predetermined action. The simulated obstacle of the present embodiment may be made of a low-cost material such as plastic or foam, and therefore may reduce the test costs of the autonomous vehicle.

Specifically, the site test control apparatus of the autonomous vehicle may, according to the deployment information of the simulated obstacle, control the simulated obstacle corresponding to a simulated obstacle class to perform a predetermined action at the deployment location, to test the autonomous vehicle's response performance to the deployed simulated obstacle. For example, it is possible to test whether the autonomous vehicle can detect in time the obstacle in the road conditions ahead in the test information of the test demand, and whether the autonomous vehicle can make a decision and perform control in time, safely avoid the obstacle and avoid occurrence of the danger. If the autonomous vehicle cannot do these, the tester may adjust the autonomous vehicle's decision and control parameters under the scenario of the test information, thereby improving the autonomous vehicle's travel safety.

For example, optionally, communication between the site test control apparatus of the autonomous vehicle and the simulated obstacle in the present embodiment may employ a wired communication, but wired communication might cause more communication wires in the test site, which are likely to entangle and cause malfunction. Therefore, preferably, in the present embodiment, communication between the site test control apparatus of the autonomous vehicle and the simulated obstacle employs a wireless communication. At this time, step 102 may specifically be: according to the deployment information of the simulated obstacle, controlling, in a wireless communication manner, the simulated obstacle corresponding to the simulated obstacle class to perform a predetermined action at the deployment location.

According to the autonomous vehicle site test method of the present embodiment, it is feasible to, in the site test, collect state information of the autonomous vehicle in real time; according to the state information of the autonomous vehicle and a pre-obtained test demand, obtain deployment information of a simulated obstacle needed in the test, wherein the deployment information of the simulated obstacle includes a simulated obstacle class, a deployment location of the simulated obstacle and a predetermined action of the simulated obstacle; according to the deployment information of the simulated obstacle, controlling the simulated obstacle corresponding to the simulated obstacle class to perform a predetermined action at the deployment location, to test the autonomous vehicle's response performance to the deployed simulated obstacle. As compared with testing the autonomous vehicle in the real road in the prior art, the autonomous vehicle test scheme of the present embodiment may avoid people's injury and death and damages to vehicles in the real road, and thereby can effectively improve the test safety of the autonomous vehicle.

Figure 2:
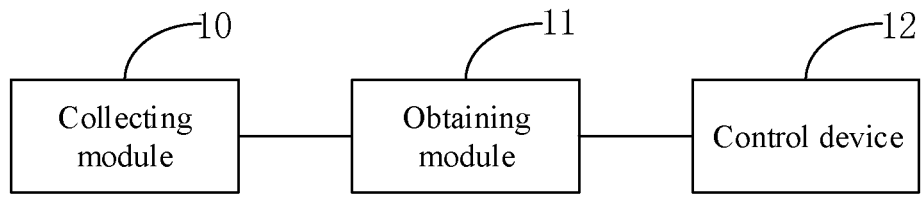
FIG. 2 is a structural diagram of a first embodiment of an autonomous vehicle site test control apparatus according to the present disclosure.

FIG. 2 is a structural diagram of a first embodiment of an autonomous vehicle site test control apparatus according to the present disclosure. As shown in FIG. 2, the autonomous vehicle site test control apparatus according to the present embodiment may specifically include: a collecting module 10, an obtaining module 11 and a control module 12.

The collecting module 10 is configured to, in a site test, collect state information of the autonomous vehicle in real time;

The obtaining module 11 is configured to, according to the state information of the autonomous vehicle collected by the collecting module 10 and a pre-obtained test demand, obtain deployment information of a simulated obstacle needed in the test, wherein the deployment information of the simulated obstacle includes a simulated obstacle class, a deployment location of the simulated obstacle and a predetermined action of the simulated obstacle;

The control module 12 is configured to, according to the deployment information of the simulated obstacle obtained by the obtaining module 11, control the simulated obstacle corresponding to the simulated obstacle class to perform a predetermined action at the deployment location, to test the autonomous vehicle's response performance to the deployed simulated obstacle.

Principles employed by the autonomous vehicle site test control apparatus according to the present embodiment to implement the site test of the autonomous vehicle and the resultant technical effects are the same as those of the above-mentioned method embodiments. For particulars, please refer to the depictions of the aforesaid relevant method embodiments, and no detailed depictions will be presented here.

Figure 3:
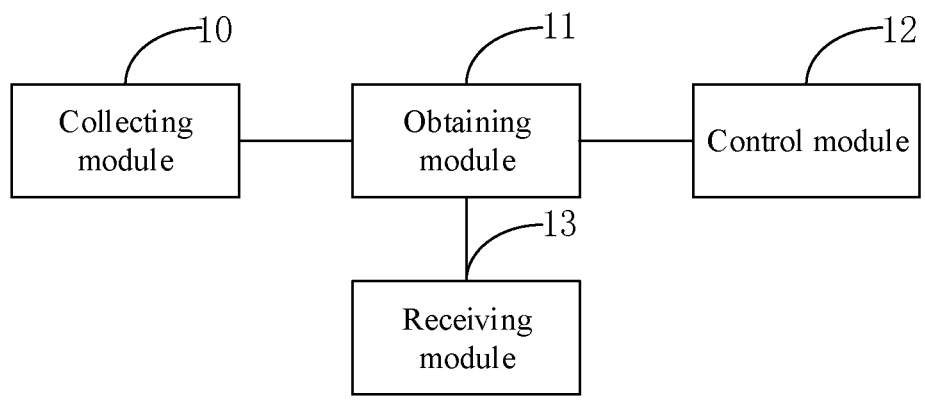
FIG. 3 is a structural diagram of a second embodiment of an autonomous vehicle site test control apparatus according to the present disclosure.

FIG. 3 is a structural diagram of a second embodiment of an autonomous vehicle site test control apparatus according to the present disclosure. As shown in FIG. 3, the autonomous vehicle site test control apparatus according to the present embodiment further includes the following technical solution on the basis of the technical solution of the embodiment shown in FIG. 2.

In the autonomous vehicle site test control apparatus according to the present embodiment, the obtaining module 11 is specifically configured to:

judge whether the state information of the autonomous vehicle reaches predetermined state information of the autonomous vehicle set in the test demand;

if yes, obtain, from the test demand, deployment information of the simulated obstacle needed in the test.

Further optionally, in the autonomous vehicle site test control apparatus according to the present embodiment, the collecting module 10 is specifically configured to receive in real time at least one of the autonomous vehicle's location, travel speed, travel direction and acceleration reported by the autonomous vehicle in real time.

Further optionally, in the autonomous vehicle site test control apparatus according to the present embodiment, the collecting module 10 is specifically configured to receive, in real time, a total number of lanes of the road, transmitted by an information collecting system arranged in the test site, and an identifier of the lane where the autonomous vehicle is located.

Further optionally, as shown in FIG. 3, the autonomous vehicle site test control apparatus according to the present embodiment further comprises a receiving module 13. The receiving module 13 is configured to receive the test demand input by a tester through a human-machine interface module.

At this time, correspondingly, the obtaining module 11 is configured to obtain deployment information of the simulated obstacle needed in the test, according to the state information of the autonomous vehicle collected by the collecting module 10 and the test demand pre-obtained by the receiving module 13.

Furthermore, the simulated obstacle class of the present embodiment may include people, vehicles or traffic lights.

Further optionally, in the autonomous vehicle site test control apparatus according to the present embodiment, the control module 12 is specifically configured to, according to the deployment information of the simulated obstacle, control, in a wireless communication manner, the simulated obstacle corresponding to the simulated obstacle class to perform a predetermined action at the deployment location.

Principles employed by the autonomous vehicle site test control apparatus according to the present embodiment to implement the site test of the autonomous vehicle and the resultant technical effects are the same as those of the above-mentioned method embodiments. For particulars, please refer to the depictions of the aforesaid relevant method embodiments, and no detailed depictions will be presented here.

Figure 4:
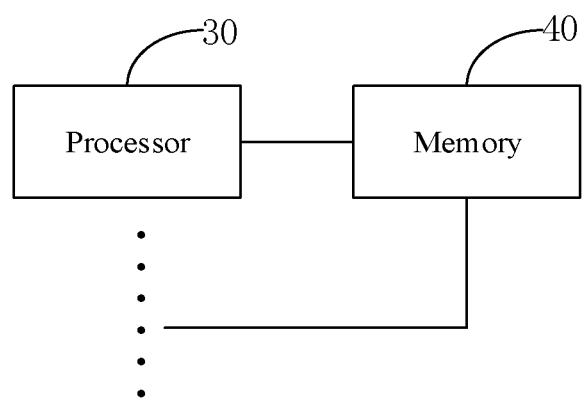
FIG. 4 is a block diagram of an embodiment of a computer device according to the present disclosure.

FIG. 4 is a block diagram of an embodiment of a computer device according to the present disclosure. As shown in FIG. 4, the computer device according to the present embodiment comprises: one or more processors 30, and a memory 40 for storing one or more programs; the one or more programs stored in the memory 40, when executed by said one or more processors 30, enable said one or more processors 30 to implement the autonomous vehicle site test method of the embodiments shown in FIG. 1-FIG. 3. The computer device of the present embodiment may serve as a control device of a control center of the test site of the autonomous vehicle, and control the site test of the autonomous vehicle. Details are not presented any more here and reference may be made to the embodiments as shown in FIG. 1-FIG. 3.

Figure 5:
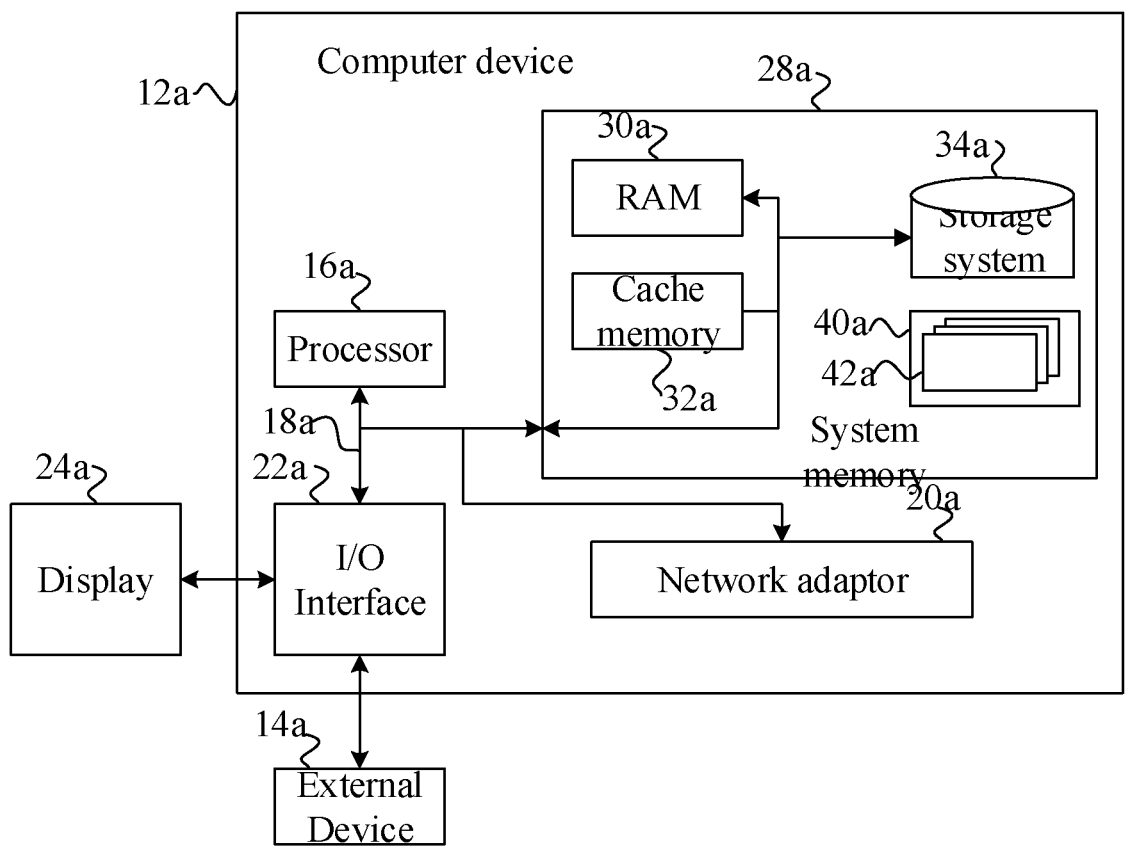
FIG. 5 is an example diagram of a computer device according to the present disclosure.

For example, FIG. 5 is an example diagram of a computer device according to an embodiment of the present disclosure. FIG. 10 shows a block diagram of an example computer device 12a adapted to implement an implementation mode of the present disclosure. The computer device 12a shown in FIG. 5 is only an example and should not bring about any limitation to the function and scope of use of the embodiments of the present disclosure.

As shown in FIG. 5, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1-FIG. 3 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 3 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 5, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the autonomous vehicle site test method shown in the above embodiments.

The present disclosure further provides a computer readable medium on which a computer program is stored, the program, when executed by a processor, implementing the autonomous vehicle site test method shown in the above embodiments.

The computer readable medium of the present embodiment may include RAM30a, and/or cache memory 32a and/or a storage system 34a in the system memory 28a in the embodiment shown in FIG. 5.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An autonomous vehicle site test method, wherein the method comprises:
   in a site test, collecting state information of the autonomous vehicle in real time on a real test site;
   according to the state information of the autonomous vehicle and a pre-obtained test demand, obtaining deployment information of a real simulated obstacle needed in the test, wherein the deployment information of the real simulated obstacle includes at least a simulated obstacle class, a deployment location of the real simulated obstacle, and a predetermined action of the real simulated obstacle;
   according to the deployment information of the real simulated obstacle, controlling the real simulated obstacle corresponding to the simulated obstacle class to perform a predetermined action at the deployment location on the real test site, to test the autonomous vehicle's response performance to the deployed real simulated obstacle.

2. The method according to claim 1, wherein the obtaining deployment information of the real simulated obstacle needed in the test, according to the state information of the autonomous vehicle and the pre-obtained test demand, comprises:
   judging whether the state information of the autonomous vehicle reaches predetermined state information of the autonomous vehicle set in the test demand;
   if the state information of the autonomous vehicle reaches the predetermined state information of the autonomous vehicle set in the test demand: obtaining, from the test demand, deployment information of the simulated obstacle needed in the test.

3. The method according to claim 1, wherein the collecting state information of the autonomous vehicle in real time comprises:
   receiving in real time at least one of the autonomous vehicle's location, travel speed, travel direction, and acceleration reported by the autonomous vehicle in real time.

4. The method according to claim 3, wherein the collecting state information of the autonomous vehicle in real time further comprises:
receiving, in real time, a total number of lanes of the road where the autonomous vehicle travels, transmitted by an information collecting system arranged in the real test site, and an identifier of a lane where the autonomous vehicle is located.

5. The method according to claim 1, wherein before obtaining deployment information of the real simulated obstacle needed in the test, according to the state information of the autonomous vehicle and the pre-obtained test demand, the method further comprises:
receiving the test demand input by a tester through a human-machine interface module,
wherein the simulated obstacle class includes people, vehicles, or traffic lights.

6. The method according to claim 1, wherein the step of, according to the deployment information of the real simulated obstacle, controlling the real simulated obstacle corresponding to the simulated obstacle class to perform the predetermined action at the deployment location, comprises:
according to the deployment information of the real simulated obstacle, controlling, in a wireless communication manner, the real simulated obstacle corresponding to the simulated obstacle class to perform the predetermined action at the deployment location.

7. A computer device, comprising:
one or more processors; and
a storage storing one or more programs that, when executed by said one or more processors, enable said one or more processors to implement an autonomous vehicle site test method, wherein the method comprises:
in a site test, collecting state information of the autonomous vehicle in real time on a real test site;
according to the state information of the autonomous vehicle and a pre-obtained test demand, obtaining deployment information of a real simulated obstacle needed in the test, wherein the deployment information of the real simulated obstacle includes at least a simulated obstacle class, a deployment location of the real simulated obstacle, and a predetermined action of the real simulated obstacle;
according to the deployment information of the real simulated obstacle, controlling the real simulated obstacle corresponding to the simulated obstacle class to perform a predetermined action at the deployment location on the real test site, to test the autonomous vehicle's response performance to the deployed real simulated obstacle.

8. The computer device according to claim 7, wherein the obtaining deployment information of the real simulated obstacle needed in the test, according to the state information of the autonomous vehicle and the pre-obtained test demand, comprises:
judging whether the state information of the autonomous vehicle reaches predetermined state information of the autonomous vehicle set in the test demand;
if the state information of the autonomous vehicle reaches the predetermined state information of the autonomous vehicle set in the test demand: obtaining, from the test demand, deployment information of the real simulated obstacle needed in the test.

9. The computer device according to claim 7, wherein the collecting state information of the autonomous vehicle in real time comprises:
receiving in real time at least one of the autonomous vehicle's location, travel speed, travel direction, and acceleration reported by the autonomous vehicle in real time.

10. The computer device according to claim 9, wherein the collecting state information of the autonomous vehicle in real time further comprises:
receiving, in real time, a total number of lanes of the road where the autonomous vehicle travels, transmitted by an information collecting system arranged in the real test site, and an identifier of a lane where the autonomous vehicle is located.

11. The computer device according to claim 7, wherein before obtaining deployment information of the real simulated obstacle needed in the test, according to the state information of the autonomous vehicle and the pre-obtained test demand, the method further comprises:
receiving the test demand input by a tester through a human-machine interface module,
wherein the simulated obstacle class includes people, vehicles, or traffic lights.

12. The computer device according to claim 7, wherein the step of, according to the deployment information of the real simulated obstacle, controlling the mal simulated obstacle corresponding to the simulated obstacle class to perform the predetermined action at the deployment location, comprises:
according to the deployment information of the real simulated obstacle, controlling, in a wireless communication manner, the real simulated obstacle corresponding to the simulated obstacle class to perform the predetermined action at the deployment location.

13. A computer readable medium on which a computer program is stored, wherein the computer program, when executed by one or more processors, implements an autonomous vehicle site test method, wherein the method comprises:
in a site test, collecting state information of the autonomous vehicle in real time on a real test site;
according to the state information of the autonomous vehicle and a pre-obtained test demand, obtaining deployment information of a real simulated obstacle needed in the test, wherein the deployment information of the real simulated obstacle includes at least a simulated obstacle class, a deployment location of the real simulated obstacle, and a predetermined action of the real simulated obstacle;
according to the deployment information of the real simulated obstacle, controlling the real simulated obstacle corresponding to the simulated obstacle class to perform a predetermined action at the deployment location on the real test site, to test the autonomous vehicle's response performance to the deployed real simulated obstacle.

14. The computer readable medium according to claim 13, wherein the obtaining deployment information of the real simulated obstacle needed in the test, according to the state information of the autonomous vehicle and a pre-obtained test demand, comprises:
judging whether the state information of the autonomous vehicle reaches predetermined state information of the autonomous vehicle set in the test demand;
if the state information of the autonomous vehicle reaches the predetermined state information of the autonomous vehicle set in the test demand: obtaining, from the test demand, deployment information of the simulated obstacle needed in the test.

15. The computer readable medium according to claim 13, wherein the collecting state information of the autonomous vehicle in real time comprises:

receiving in real time at least one of the autonomous vehicle's location, travel speed, travel direction, and acceleration reported by the autonomous vehicle in real time.

16. The computer readable medium according to claim 15, wherein the collecting state information of the autonomous vehicle in real time further comprises:

receiving real time, a total number of lanes of the road where the autonomous vehicle travels, transmitted by an information collecting system arranged in the real test site, and an identifier of a lane where the autonomous vehicle is located.

17. The computer readable medium according to claim 13, wherein before obtaining deployment information of the real simulated obstacle needed in the test, according to the state information of the autonomous vehicle and the pre-obtained test demand, the method further comprises:

receiving the test demand input by a tester through a human-machine interface module, wherein the simulated obstacle class includes people, vehicles, or traffic lights.

18. The computer readable medium according to claim 13, wherein the step of, according to the deployment information of the real simulated obstacle, controlling the real simulated obstacle corresponding to the simulated obstacle class to perform the predetermined action at the deployment location, comprises:

according to the deployment information of the real simulated obstacle, controlling, in a wireless communication manner, the real simulated obstacle corresponding to the simulated obstacle class to perform the predetermined action at the deployment location.

* * * * *